Sept. 19, 1933.  W. S. JOSEPHSON  1,927,175
HYDRATED SOLID CARBON DIOXIDE AND METHOD OF MAKING THE SAME
Filed Oct. 16, 1929  2 Sheets-Sheet 1
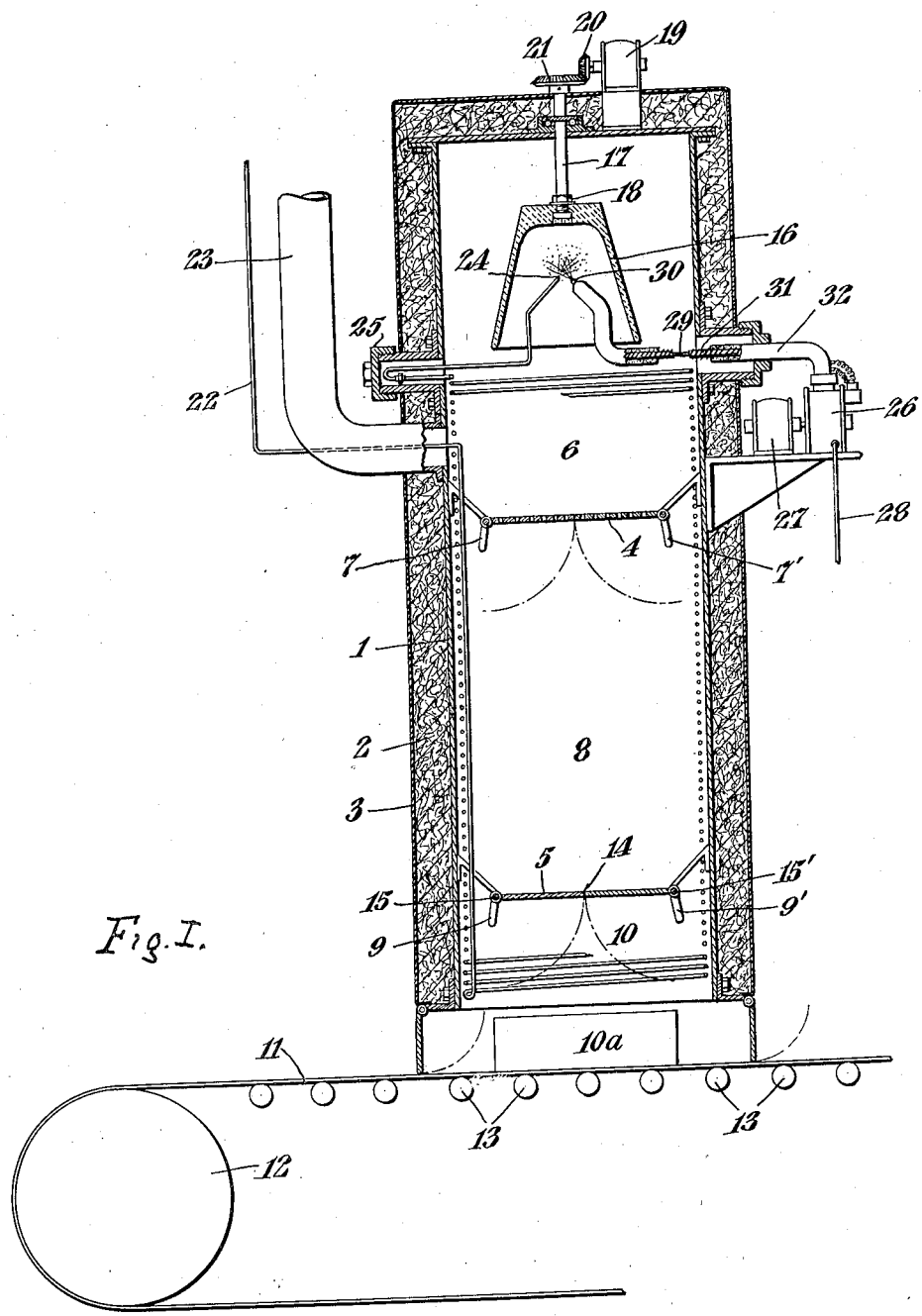
Fig. I.
INVENTOR
Walter S. Josephson
BY
Charles Holland
ATTORNEY Sept. 19, 1933. W. S. JOSEPHSON 1,927,175
HYDRATED SOLID CARBON DIOXIDE AND METHOD OF MAKING THE SAME
Filed Oct. 16, 1929 2 Sheets-Sheet 2
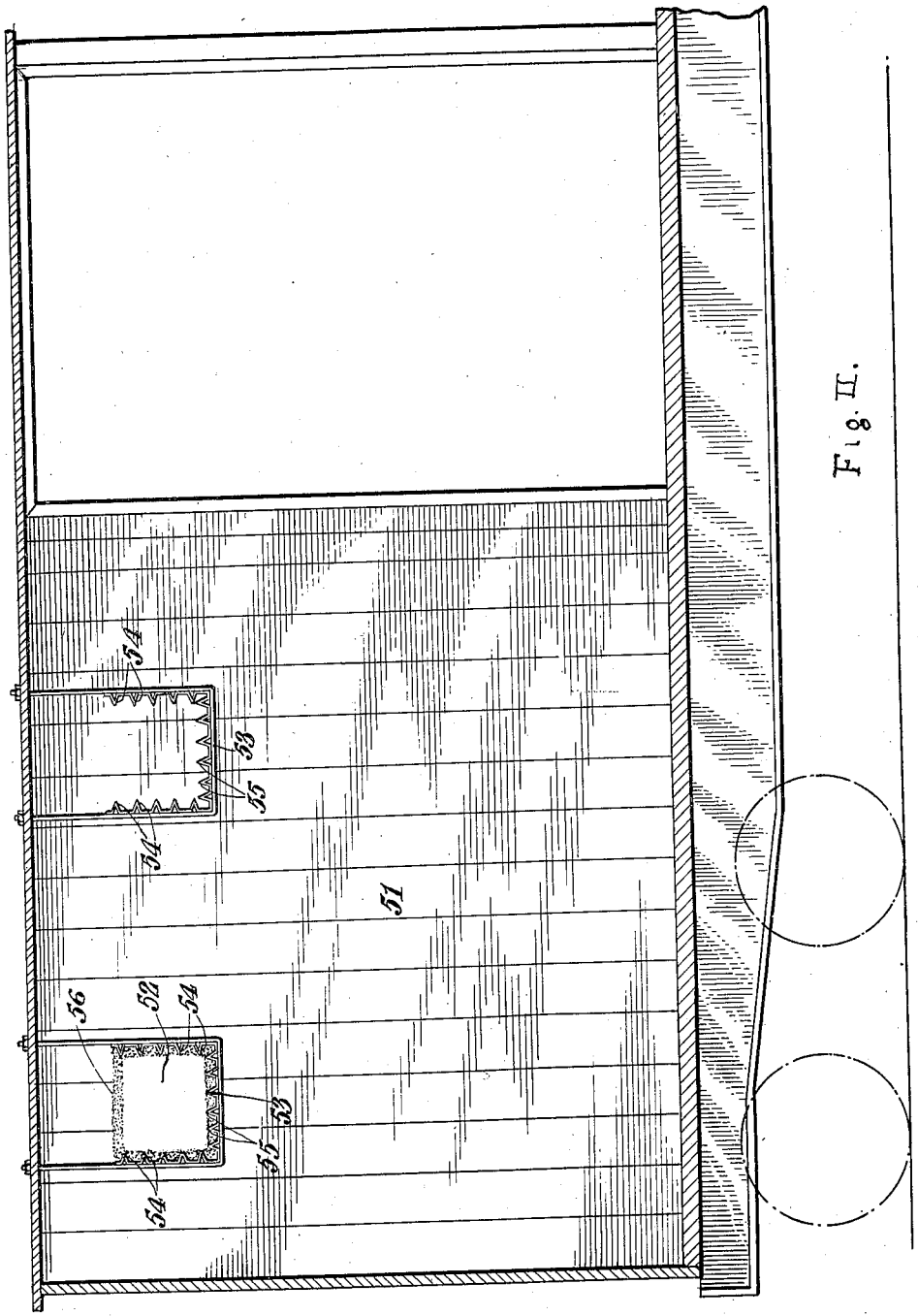
INVENTOR
Walter S. Josephson
BY
Charles Holland
ATTORNEY Patented Sept. 19, 1933

1,927,175

UNITED STATES PATENT OFFICE 1,927,175

HYDRATED SOLID CARBON DIOXIDE AND METHOD OF MAKING THE SAME

Walter S. Josephson, Brooklyn, N. Y., assignor to Dryice Corporation of America, New York, N. Y., a corporation of Delaware Application October 16, 1929. Serial No. 399,911

8 Claims. (Cl. 62—91.5)

The present invention relates to the manufacture of hydrated solid carbon dioxide and more particularly to methods of refrigeration that employ this material as a refrigerant.

The use of carbon dioxide snow either in loose, flocculent form, or pressed into a solid is well known. This material has certain very great advantages as a refrigerant by reason of the fact that carbon dioxide freezes at a temperature of —112° F., approximately. As it sublimes, it absorbs heat rapidly and produces a very low temperature in its surroundings. This circumstance gives the material certain valuable qualities for refrigeration.

It has, however, certain defects as a refrigerant which are well recognized but which have not been heretofore successfully overcome despite many attempts to do so. As the temperature of carbon dioxide is lowered it gives up whatever moisture it may contain so that when it reaches the low temperature at which it freezes practically all water has been expelled and the form known as carbon dioxide snow or ice is a dry, essentially moistureless material. Furthermore, the solid $CO_2$ on absorbing heat passes directly and rapidly to the gaseous form without passing through the intermediate liquid state and this gas has not only a great power of absorbing heat as pointed out above, but it has an exceptional avidity for moisture. This characteristic increases markedly as its temperature rises except insofar as it may be partially satisfied by the moisture which it absorbs during the time of such temperature rise. So extreme is its action in this respect that it exerts a very destructive surface suction on meats, fruits and vegetables exposed to it. Lettuce, for instance, which has a very considerable water content, is rapidly wilted and faded; meats become blackened at the surface; and many varieties of fish are so seriously affected that the colors are actually caused to run, the whole surface becoming discolored and the moist slimy film covering the skin and scales being dried and caked and the scales warped so that they stand out from the body. Such a thorough dehydration takes place that the flavor of the vegetable or meat which depends on volatile elements is in large part abstracted with the water.

Moreover, I have heretofore sought to overcome this serious dehydrating effect of pure $CO_2$ when used as a refrigerant by hydrating the gas coming off from the solid block. This method consisted in providing auxiliary water receptacles through which the gas was caused or permitted to bubble or in providing exposed receptacles filled with water within the space to be refrigerated.

This system has, however, certain very grave disadvantages. For, although it recognizes that if the appetite of the $CO_2$ gas for water be satisfied by the means provided, it will have little or no harmful effects upon the materials to be refrigerated, it is very difficult by this method sufficiently to saturate the gas to prevent these effects. The reason for this is that very frequently temperatures are desired that are below the freezing point of water and, consequently, the water is frozen before the gas can take it up in sufficient quantity. Again, the water being in open vessels may spill in the compartment to be refrigerated and become rancid. Moreover, and this is especially true where the system is applied to cars making long journeys, constant attention is required to keep the receptacles filled with water. The system is above all a cumbersome and inefficient makeshift to perform a desirable function, for it is evident that the gas may act upon the materials to be refrigerated before it can reach the water in the receptacles, or that even when it passes through the water it may bubble in large bubbles so rapidly that it does not become sufficiently hydrated to be rendered harmless.

It should here be pointed out also that the importance in refrigeration of efficiently hydrating the $CO_2$ lies in its absolute necessity to effect the preservation of the fresh condition of foods exposed to it. Fruits and vegetables, for example, are living organisms even after they have been picked and the metabolism, if it may be called such, of the organism continues until the stage of full ripening. Indeed, decay, when the chemical processes have not been interfered with, may be considered only an advanced stage of ripening. But should these processes be stopped, the fruit or vegetable dies and decomposition from both within and without sets in.

We may illustrate this by a consideration of the effect of pure carbon dioxide upon an apple. The apple needs oxygen to preserve its life and, consequently, when placed in an atmosphere of carbon dioxide, it dies. The pores of the apple cease to function and the waste matter that would normally have been exuded through the skin, forms a brown waxy deposit under the skin. The ripening process, during which the vitamine content of the fruit is developed, stops. Decay then begins both at the surface and in the interior and an unwholesome, unsatisfactory product is the result.

In this, I do not ignore the valuable function of pure carbon dioxide in furnishing a sterile atmosphere free from the bacteria that cause infection of fruits and vegetables in the air, but the point is that for all percentages of carbon dioxide gas, whether beneficial or harmful, any beneficial effects are likely to be increased and harmful effects decreased, by my present method of maintaining large percentages of moisture in the atmosphere of the refrigerated space so as to prevent dehydration of the product. There is also the advantage of constant temperature tendency resulting from moisture in such atmosphere. It is an object of the present invention to provide a solid carbon dioxide (and I use the term "solid carbon dioxide" to indicate both the loose, flocculent "snow" and the snow compacted into "ice") which is hydrated almost to the point of saturation. It is a further object to provide a solid refrigerant consisting of carbon dioxide and water that furnishes an atmosphere that is sterile and free from bacteria, and at the same time charged with water vapor in quantity sufficient to prevent dehydration of the materials exposed to it and to supply sufficient oxygen to sustain the life of fruits and vegetables to be refrigerated. It is a further object to provide a method and means for producing this solid, hydrated carbon dioxide. It is a further object to provide a system of refrigeration which employs solid, hydrated carbon dioxide as a refrigerant which on melting gives off carbon dioxide and water both in vapor form, filling the space to be refrigerated with a sterile, hydrated and sustaining atmosphere.

I have discovered that carbon dioxide snow can be combined with water vapor at the time the snow is formed and that the amount of water in combination can be regulated in accordance with the temperatures desired in the space to be refrigerated, the limiting factors being the saturation point of the carbon dioxide at this temperature and the amount of moisture present. There is thus produced when this snow is compacted in known manner, a block of hydrated solid carbon dioxide with a predetermined moisture content. I have found that this hydrated solid is an ideal refrigerant, retaining all the sterilizing and preserving qualities of the carbon dioxide, while preventing the dehydrating effect to which reference has been made and, at the same time providing the moisture so essential to keeping the materials to be refrigerated in their original, fresh condition.

The method of making the hydrated solid of this invention will be more clearly understood from the drawing in which Fig. I shows diagrammatically a preferred form of apparatus in which the solid can be manufactured. Fig. II illustrates in section a block of the hydrated solid as it is applied in use.

Referring now to Fig. I, a tank or cylinder, 1, of steel is well insulated against heat by a packing, 2, of hair felt or similar material held in place by a canvas outer covering, 3. The interior of the tank, 1, is divided into compartments by the gate or trap doors, 4, having the perforations and by the air tight gate or trap doors, 5. The upper compartment, 6, is the compartment within which the snow is made and from which it drops when the load of snow on the doors, 4, is sufficient to overcome the resistance of the counterweights, 7 and 7', and thus to open doors, 4, into the intermediate compartment, 8. Similarly in compartment, 8, when the load of snow precipitated from compartment, 6, has accumulated on the doors, 5, in quantity sufficient to overcome the resistance of the counterweights, 9 and 9', the doors, 5, open and drop the snow into compartment, 10, where cars indicated at 10a, travelling on an endless belt, 11, remove it from the apparatus. The belt, 11, is indicated as passing over a system of rollers including the large roller, 12, and the small rollers, 13, the action of which is obvious.

It will, of course, be understood that when the doors, 4 and 5, carry no load, the counterweights, 7 and 7' and 9 and 9', keep them shut. It should also be mentioned that the doors, 5, are rendered airtight by the seal, 14, and the airtight hinges, 15 and 15'; for it is important that the compartments, 6 and 8, should have no air within them. The air may be expelled easily by flushing both compartments with carbon dioxide gas at sufficient pressure to displace the air and a pressure of two ounces above atmospheric pressure should, for satisfactory results under ordinary conditions, always be maintained in compartment, 8, to prevent the entrance of outside air through accidental leaks.

The hydrated solid of this invention is manufactured in compartment, 6. The preferred manner in which the solid is made requires an intimate union of carbon dioxide at a low temperature with water vapor finely divided, precautions being taken to prevent the water vapor from freezing before coming into contact with the carbon dioxide. This is accomplished in the preferred form of apparatus in the following manner.

A dome, 16, insulated against heat or formed of heat insulating material, such as porcelain or other earth or clay, is mounted on a shaft, 17, through a lead washer, 18. The shaft, 17, is revolved by the motor, 19, and the gears, 20 and 21, thus revolving the dome, 16, rapidly.

The gas and water are sprayed, mingled and frozen under the dome, 16, into which separate carbon dioxide and water lines lead. The course of these lines is now described.

From a compressor, not shown, in which carbon dioxide is reduced to liquid form, a pipe, 22, preferably of about ⅛ inch outside diameter, leads through the exhaust pipe, 23, into the tank, 1, at the side thereof. It is carried thence to the bottom of the tank, 1, whence through coils circling the inside tank walls, it is brought through the very low temperatures of compartments, 8 and 10, into the snow making compartment, 6, where it enters the dome, 16, to the nozzle, 24. For convenience in repairing or changing the nozzle in case the $CO_2$ should freeze within it, a removable plug, 25, is provided through which access may be had to the pipe, 22, and the nozzle portion, 24, may be detached.

The waterline is preferably in an opposed relation to the gas line. A pump, 26, actuated by the motor, 27, connects with a water supply by means of the pipe, 28. From the pump, 26, the water is forced through the pipe, 29, which is preferably about ¼ inch outside diameter, into the dome, 16, through the nozzle, 30. In order to prevent the water in the pipe, 29, from freezing where it passes through the low temperatures of the snow making chamber, 6, it is electrically heated by the electrically insulated coil, 31, and further protected by a packing of heat insulating material, 32, which may be a covering of magnesia of about 1¼ inches. I may also spray steam through the nozzle, 30, at high temperature and under high pressure to obtain the same result.

As a considerable portion of carbon dioxide sprayed into the dome is not deposited as snow but escapes into the snow making chamber in gaseous form it is economical to draw it out of the chamber and return it to the compressor, not shown. This is effected through a large pipe, 23, by means of a fan or other known device. The pipe, 23, may be of an outside diameter of 4 inches and as the incoming carbon dioxide line, 22, passes through it bearing liquid $CO_2$, the gas is returned to the compressor at a low temperature.

The operation of the snow making device is as follows:

The carbon dioxide is liquefied in the compressor, now shown. It is forced thence under a pressure of 850–1000 pounds per square inch through the pipe, 22, which as stated carries it to the bottom of the tank, 1, and the pipe, 22, being coiled about the interior of the tank, 1, the liquid $CO_2$ is further cooled by the snow in the tank. When the liquid $CO_2$ arrives at the nozzle, 24, under the high pressure above stated, it is allowed to escape through a nozzle into the dome, 16, and its sudden expansion vaporizes part of it, thereby reducing the temperature sufficiently to cause the remainder to solidify as "snow."

On the other side of the tank, 1, water is forced by the pump, 26, through the pipe, 29, at high pressure. Pressures of 500 pounds and 1000 pounds per square inch have been found advantageous. The water under this pressure is discharged through the nozzle, 30, into the dome, 16, as a very finely divided spray. This water spray and the carbon dioxide spray both being powerfully propelled against each other from opposed directions by their respective pressures intimately intermingle and combine, falling as a snow upon the upper trap doors or gates, 4, at the bottom of the snow making compartment, 6, and thence drop, as above described, into compartment, 8, and ultimately into the car, 10a, whence the snow is carried away to be compressed in known manner into the hydrated solid or ice of this invention.

Fig. II shows in section a block of the hydrated solid with its insulating blanket of moisture snow on all sides as it appears in use. In this figure, 51 represents a space to be refrigerated, as, for example, a car. The hydrated solid, 52, is supported upon brackets, 53, bearing points 54 and 55 of insulating material, on which the solid block rests. A blanket of moisture snow 56, formed by the moisture of condensation picked up from the gas from the melting hydrated solid forms upon the exposed surfaces of the block and acts as a natural thermostatic control as is hereinafter set forth.

I have discovered by careful experiments that the action of the hydrated carbon dioxide snow or ice of this invention is very different from that of pure solid carbon dioxide and the results produced by each likewise differ. It should here be pointed out that when the temperature of the hydrated solid is raised above the freezing point ($-112°$ F.) both the $CO_2$ and $H_2O$ go off in the form of a gaseous combination apparently equivalent to that of the solid.

The more successful systems using pure carbon dioxide snow as a refrigerant, provide a separate well insulated compartment to hold the snow apart from the materials to be refrigerated. In this compartment the snow is caused or permitted to melt gradually and it is then, in gaseous form, allowed to pass through a pipe into the space to be refrigerated. This space thus becomes entirely filled with dehydrated $CO_2$, which is permitted to come into contact with the materials to be refrigerated. The harmful effects are clearly to be observed.

On the other hand, the hydrated solid of the present invention is free from the injurious effects pointed out above. Its use does not entail any substantial dehydration of the materials exposed to it. It may therefore be placed in the space to be refrigerated without insulating it by separate compartment walls and although the specific manner of employing it will be governed by the specific conditions encountered, it should ordinarily be placed near the top of the refrigerated compartment and on points rather than on flat surfaces. This method of support exposes all surfaces of the bulk and distributes the heat absorption by the bulk of the ice over all its unsupported surfaces and permits a blanket of condensed moisture to form as a snow on all the surfaces of the hydrated solid block. This snow blanket, being of an extremely fluffy and porous nature due to the passage through it of gas from the melting block, affords a high degree of insulation. The blanket of moisture snow thus acts between the ranges of temperature suitable for refrigeration of food stuffs with high efficiency as a natural thermostatic control. For, as the temperature drops below the freezing point of water, the blanket will be augmented in thickness the temperature of its external surface increasing up to the freezing point of water as a limit; and when the temperature rises and the gaseous atmosphere consequently acquires a greater capacity to carry moisture, the blanket is reduced in thickness by reason of the absorption of moisture from it by the gas. But this reduction of the blanket permits a more rapid rate of melting of the hydrated solid and the temperature of the compartment is once more restored to the desired point.

It will be evident from this that the hydrated solid of this invention can be so produced as to maintain any desired predetermined temperature valuation in the refrigerated compartment and so as to maintain that valuation at all time. Pure liquid $CO_2$ is not a true liquid; and pure solid $CO_2$ is not a true solid. This is equally true of the solid hydrated carbon dioxide of this invention although the addition of moisture makes for a closer union and binder for the carbon dioxide particles. Blocks made from the hydrated carbon dioxide, have greater structural strength and, where the blocks are made by compressing the snow, as herein described, are far less subject to deterioration when kept in storage for considerable periods. That is to say, the block is not only of more uniform density, but also tends to remain of uniform density for long periods as contrasted with blocks compressed from the pure snow, which latter sometimes become non-uniform and "sandy" at the center. It is, however, simply a frozen gas and as it is compacted to greater density it is frozen latent energy which upon exposure to heat resolves itself back to its original form, not gradually through the liquid state as is the case with water ice, but explosively.

I have observed that when the temperature of the hydrated solid is raised above approximately $-108°$ F., minute particles fly off the surface of the block and expand with the rapidity of an explosion. The distance travelled is about a thousand diameters of the particle thus propelled. Through the physical force of this violent expansion, the water vapor and the carbon dioxide are carried off together as vapor without any intermediate state of either as liquid.

The condition of these vapor particles presents phenomena similar to the moisture particles in atmospheric fog. For as the fog particles consist of a number of moisture particles grouped around a dust particle, so apparently, the gas given off from a block of this hydrated solid during melting consists of a group of carbon dioxide particles grouped about a moisture particle. This is true not only of the gas but is the condition prevailing in the solid whether as snow or ice. It is my opinion, based upon observation of the behavior of this hydrated solid, that, under the law of partial pressure, the water vapor is not frozen as a solid but the combined gas, carbon dioxide, plus water, is combined and frozen as a compound, $CO_2 + H_2O$. It is also my opinion, based upon observation of this behavior, that, upon the expansion of the particle from solid directly to gas, a portion of the latent energy is consumed in restoring the moisture content to vapor form. But whether this opinion be well founded or not, it is a fact that on melting the water goes off with the carbon dioxide in vapor form and that upon subsequently condensing to "dew" or snow we find both constituents present.

It follows, therefore, from what has been hereinabove disclosed, that if the moisture content be controlled during the manufacture of the solid, the behavior and action of the solid upon melting can be predetermined. I can, for instance, by hydrating the solid carbon dioxide to a greater or less degree control the thickness of the blanket of water snow upon the surfaces of the hydrated solid; and it has been hereinabove made plain that this blanket acts as an automatic thermostatic control for the refrigerated compartment.

I have found that, for ordinary refrigeration requirements, as, for example, in preserving fruits, vegetables and cut flowers and meats as well, very advantageous results are obtained if I control the percentage of moisture in the hydrated solid at about 12½% below the saturation point (dewpoint) of carbon dioxide at room temperature. By this means, I regulate the tendency inherent in pure carbon dioxide alternately to pick up and deposit moisture from its surroundings, a tendency which because it violently affects the materials to be refrigerated constitutes one of its most serious defects. As the quantity of moisture in the hydrated solid has thus been predetermined at 12½% less than complete saturation of the pure carbon dioxide, the gas from the melting block cannot under any conditions pick up more than that quantity from the atmosphere within the refrigerated space. This quantity of moisture will be easily satisfied without drawing upon the water content of the fruits, vegetables or other materials exposed to it.

At the same time, if it is desired to provide an atmosphere of the hydrated gas, either more or less saturated, this can be taken care of in the manufacture of the solid material. It is possible by the method hereinabove set forth to incorporate with the solid carbon dioxide a quantity of water, either more or less than enough to satisfy all water demands of the carbon dioxide gas at room temperature. The solid may thus be hydrated either to the saturation point of the carbon dioxide gas at room temperature, or above or below that point. By hydrating the solid material in this manner we obtain a solid hydrated carbon dioxide material which, when used as a refrigerant, provides in the refrigerated space a cold, sterile and preserving atmosphere which will keep vegetables and animal materials such as foods or cut flowers, in a state substantially of original freshness.

The hydrated solid of this invention is suitable for use even in the ordinary household ice boxes since the natural thermostatic control hereinbefore described and the moisture laden, sterile atmosphere given off from the melting block, provide an ideal condition for the preservation of foods in a fresh condition for longer periods of time than with any other form of refrigeration with which I am familiar.

While I have illustrated my invention with particular reference to its uses as a refrigerant and while I believe it will find its most extensive use in that field, I wish to be distinctly understood that the hydrated solid hereinabove described is claimed as a product irrespective of the use to which it may be put.

What I claim is:—

1. As an article of manufacture hydrated solid carbon dioxide containing more than one per cent of water.

2. The method of making a carbon dioxide refrigerant which includes solidifying carbon dioxide in intimate association with a substantial percentage of water whereby to produce hydrated solid carbon dioxide having the character of effecting a thermostatic control of the temperature within the space being refrigerated.

3. The method of making a carbon dioxide refrigerant which includes evaporating liquid carbon dioxide to form solid in intimate association with a substantial percentage of water whereby to produce hydrated solid carbon dioxide having the character of effecting a thermostatic control of the temperature within the space being refrigerated.

4. The method of making a carbon dioxide refrigerant which includes evaporating liquid carbon dioxide to form solid by jet expansion in an insulated chamber, in intimate association with a substantial percentage of water whereby to produce hydrated solid carbon dioxide having the character of effecting a thermostatic control of the temperature within the space being refrigerated.

5. The method of making a carbon dioxide refrigerant which includes evaporating liquid carbon dioxide to form solid by jet expansion in an insulated chamber, in intimate association with a substantial percentage of water in the form of sprayed liquid whereby to produce hydrated solid carbon dioxide having the character of effecting a thermostatic control of the temperature within the space being refrigerated.

6. The method of making a carbon dioxide refrigerant which includes evaporating liquid carbon dioxide to form solid by jet expansion in an insulated chamber, in intimate association with a substantial percentage of water and compressing the solid to form a cake whereby to produce hydrated solid carbon dioxide having the character of effecting a thermostatic control of the temperature within the space being refrigerated.

7. The method of making a carbon dioxide refrigerant which includes evaporating liquid carbon dioxide to form solid by jet expansion in an insulated chamber, in intimate association with a substantal percentage of water in the form of sprayed liquid and compressing the solid to form a cake.

8. The method of making a carbon dioxide refrigerant which includes solidifying carbon dioxide in intimate association with a substantial percentage of another ingredient having much higher melting and evaporation temperatures, at atmospheric pressure whereby to produce solid carbon dioxide having the character of effecting a thermostatic control of the temperature within the space being refrigerated.

WALTER S. JOSEPHSON.